United States Patent [19]

Nishido

[11] Patent Number: 5,402,275
[45] Date of Patent: Mar. 28, 1995

[54] METHOD AND APPARATUS FOR SYNCHRONIZING RECREATED DAT FRAMES AND TIME CODES

[75] Inventor: Hideki Nishido, Kodaira, Japan

[73] Assignee: Teac Corporation, Tokyo, Japan

[21] Appl. No.: 27,821

[22] Filed: Mar. 8, 1993

[30] Foreign Application Priority Data

Mar. 9, 1992 [JP] Japan .................... 4-085987

[51] Int. Cl.$^6$ .................... G11B 5/09; G11B 27/02
[52] U.S. Cl. .................... 360/51; 360/13
[58] Field of Search ............ 360/13, 14.2, 14.3, 360/26, 46, 51, 72.2

[56] References Cited

U.S. PATENT DOCUMENTS 4,896,337  1/1990  Bushy, Jr. .................... 360/51
5,172,677  1/1993  Kizu et al. .................... 360/14.2

FOREIGN PATENT DOCUMENTS

0356938  8/1989  European Pat. Off. .

Primary Examiner—Donald Hajec
Assistant Examiner—Won Tae C. Kim
Attorney, Agent, or Firm—Woodcock Washburn Kurtz Mackiewicz & Norris

[57] ABSTRACT

A system employing a shift register for serially delivering the bits of recreated IEC time code from a DAT recorder to a video recorder for synchronous playback of audio and video information. In order to accomplish exact synchronization despite possible variations in the frame lengths of the IEC time code recorded, the shift register is driven by a variable frequency clock. During playback the actual phase differences between the DAT frames and the IEC frames being output are detected, and deviations of these actual phase differences from desired phase differences between the DAT frames and IEC frames supplied are constantly monitored. The repetition frequency of the clock pulses applied to the shift register is increased or decreased whenever the deviation of each actual phase difference from one associated desired phase difference exceeds a predetermined limit.

12 Claims, 7 Drawing Sheets

METHOD AND APPARATUS FOR SYNCHRONIZING RECREATED DAT FRAMES AND TIME CODES

BACKGROUND OF THE INVENTION

This invention relates generally to digital data reproduction systems such as digital audio tape (DAT) recorders, and more particularly, to a method of, and means for, serially outputting the bits of data recreated in such apparatus for synchronization of the apparatus with some other apparatus, among other purposes.

In helical scan DAT recording, as in video recording, data is recorded on magnetic tape along a series of diagonal record tracks, as disclosed for example in European Patent Publication No. 356 938. Each track, corresponding to one frame of data, resolves itself a central PCM zone, a pair of automatic track finding (ATF) zones on both sides of the PCM zone, and a pair of subcode zones at the beginning and ending of the track. The PCM zones store the digitized audio signals, the ATF zones the tracking data, and the subcode zones the absolute time data which serves as the frame or track address.

It has recently been suggested that not only the absolute time data but additional data be recorded on the subcode zones for synchronous operation of DAT recorders and video recorders, that is, for synchronous playback of audio and video information. Currently, such recorders are of the professional class. The additional data includes time data representative of the time code specified by the International Electrotechnical Commission (IEC), and phase difference data representative of the phase difference between the DAT frames and the IEC time code frames. Each IEC time code frame is one thirtieth of a second whereas each DAT frame is one thirty-third of a second long. Adaptation is therefore necessary for writing the IEC time code on the DAT frames.

A problem has been encountered in the synchronous operation of DAT recorders and video recorders by use of the IEC time code. The IEC time code frames are not necessarily supplied to DAT recorders, as well as to video recorders, with unvarying periodicity. Assume that the IEC time code frames input to the DAT recorder include ones that are not of the standard length. Then the IEC time code data created accordingly will be written on the subcode zones of the DAT frames. When the IEC time code frames are reconstructed by subsequently reading out the time code data from the DAT, they naturally include those of other than the standard length.

The IEC time code is comprised of, for example, 80 bits per frame. After recovery from the DAT, the bits of the IEC time code are serially delivered from a buffer memory, included in the DAT recorder, to the video recorder or the like for synchronizing data recovery therefrom with that from the DAT recorder. The buffer memory has so far been driven by clock pulses of a constant recurrence rate. For this very reason the IEC time code has not been correctly output in cases where the lengths of the reconstructed IEC time code frames deviate too much from the standard. Such incorrect IEC time code has seriously hampered the exact synchronization of DAT recorders and video recorders.

Similar problems have existed in synchronously operating two video recorders, a video recorder and an optical disk drive, and other combinations of various such known devices. In independent operation of such devices, too, fluctuations in a transfer rate of the bits of the recovered data with time are liable to occur due, for example, to variations in tape speed. Such fluctuations can make impossible the correct serial production of the data bits from a buffer memory being controlled by clock pulses of a constant recurrence rate.

SUMMARY OF THE INVENTION

The present invention solves the problem of how to serially output the bits of recreated data just as they have been recorded.

Briefly stated in one aspect thereof, the invention concerns, in a data reproduction apparatus having transfer means for reading digital data on a storage medium, a method of serially outputting the bits of the recreated data as they have been recorded on the storage medium. The method dictates, first of all, to recreate data read by the transducer means on the storage medium. The bits of the recreated data are successively stored in a buffer memory, from which the data bits are serially output at a rate determined by the repetition frequency of the clock pulses applied. This repetition frequency is varied according to variations in a rate at which the bits of the recreated data are being transferred. Consequently, the recreated data bits can all be correctly output from the buffer memory even if they have been recorded nonperiodically, or have become nonperiodic on playback.

The teachings of this invention are most advantageously applicable to the synchronous operation of, typically, a DAT recorder and a video recorder, as in the embodiment of the invention to be disclosed subsequently. In this application the data bits to be serially output are those of the IEC time code which has been reproduced by the DAT recorder for delivery to the video recorder.

In order to achieve exact synchronization of the DAT and video recorders in the face of possible variations in the frame lengths of the IEC time code supplied, the actual phase differences between the DAT frames and the IEC frames being output are constantly compared with the desired phase differences between the DAT frames and IEC frames as they have been recorded. The repetition frequency of the clock pulses being applied to the buffer memory are varied according to the deviations of the actual phase differences from the desired phase differences. The IEC time code can thus be supplied to the video recorder just as it has been recorded. It is recommended that the clock pulse frequency be adjusted frame by frame for the simplicity of circuitry required.

The above and other features and advantages of this invention and the manner of realizing them will become more apparent, and the invention itself will best be understood, from a study of the following description and appended claims, with reference had to the attached drawings showing the preferred embodiment of the invention.

DESCRIPTION OF THE PREFERRED EMBODIMENT

The present invention will now be described in detail as embodied in the helical scan DAT record/playback apparatus illustrated in FIG. 1. The exemplified apparatus includes a pair of magnetic heads 10 embedded in a rotating drum 11 for data transfer with a magnetic tape 1 of a replaceable DAT cartridge 13. Partly pulled out from within the cartridge casing, the tape 1 is wrapped in a helical path around the drum and driven from reel to reel by a tape transport 14. An electric motor 12 is drivingly coupled to the drum 11 for imparting rotation thereto in step with the reel to reel travel of the tape 1.

Figure 2:
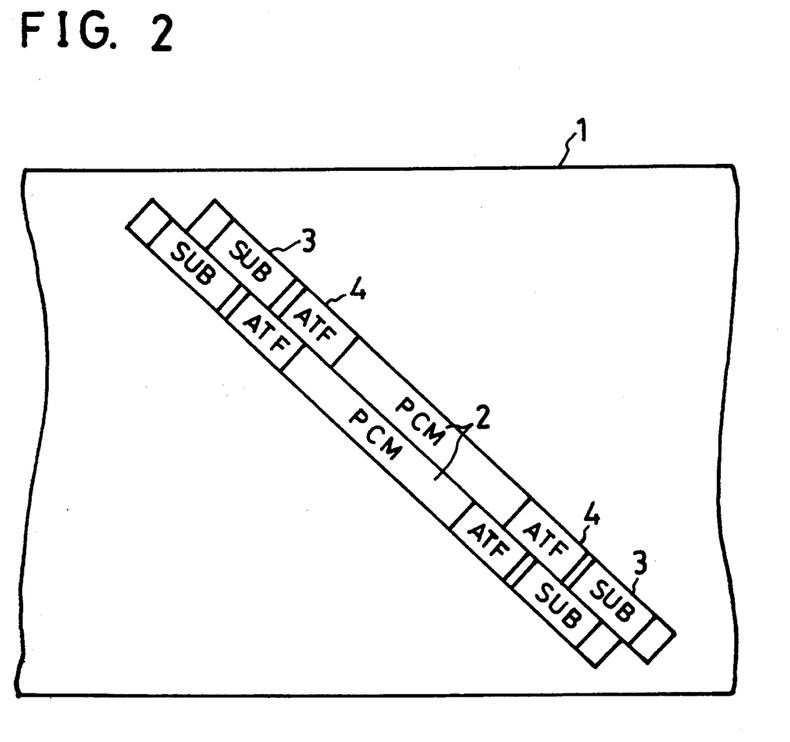
FIG. 2 is an enlarged, fragmentary illustration of the tape of the DAT cartridge for use with the FIG. 1 recorder, showing in particular the diagonal record tracks on the tape.
Figure 3:
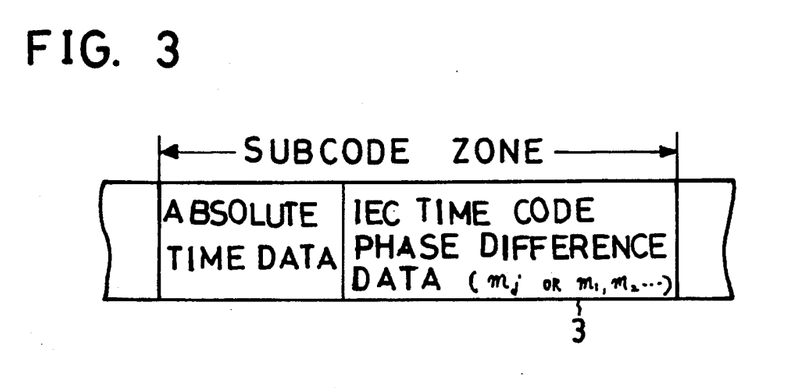
FIG. 3 shows the data recorded on the subcode zones of the FIG. 2 tracks.

FIG. 2 shows a series of diagonal tracks created alternately by the pair of heads 10 on the tape 1. Each track, which corresponds to one frame of data, is divided into a central PCM data zone 2, a pair of subcode zones 3 on both sides of the PCM data zone, and a pair of ATF zones 4 between the PCM data zone and the subcode zones. A digitized audio signal is to be recorded on the data zones 2 of all the tracks. As illustrated in FIG. 3, each subcode zone 3 stores absolute time data, IEC time code, and phase difference data. The absolute time data serves as the frame or track address. The IEC time code has been supplied from an external source and is written according to the standard IEC time code frames different from the DAT frames. The phase difference data mj or $m_1$, $m_2$, $m_3$, ... represents the phase difference between each DAT frame and one associated frame of the IEC time code supplied.

Figure 1:
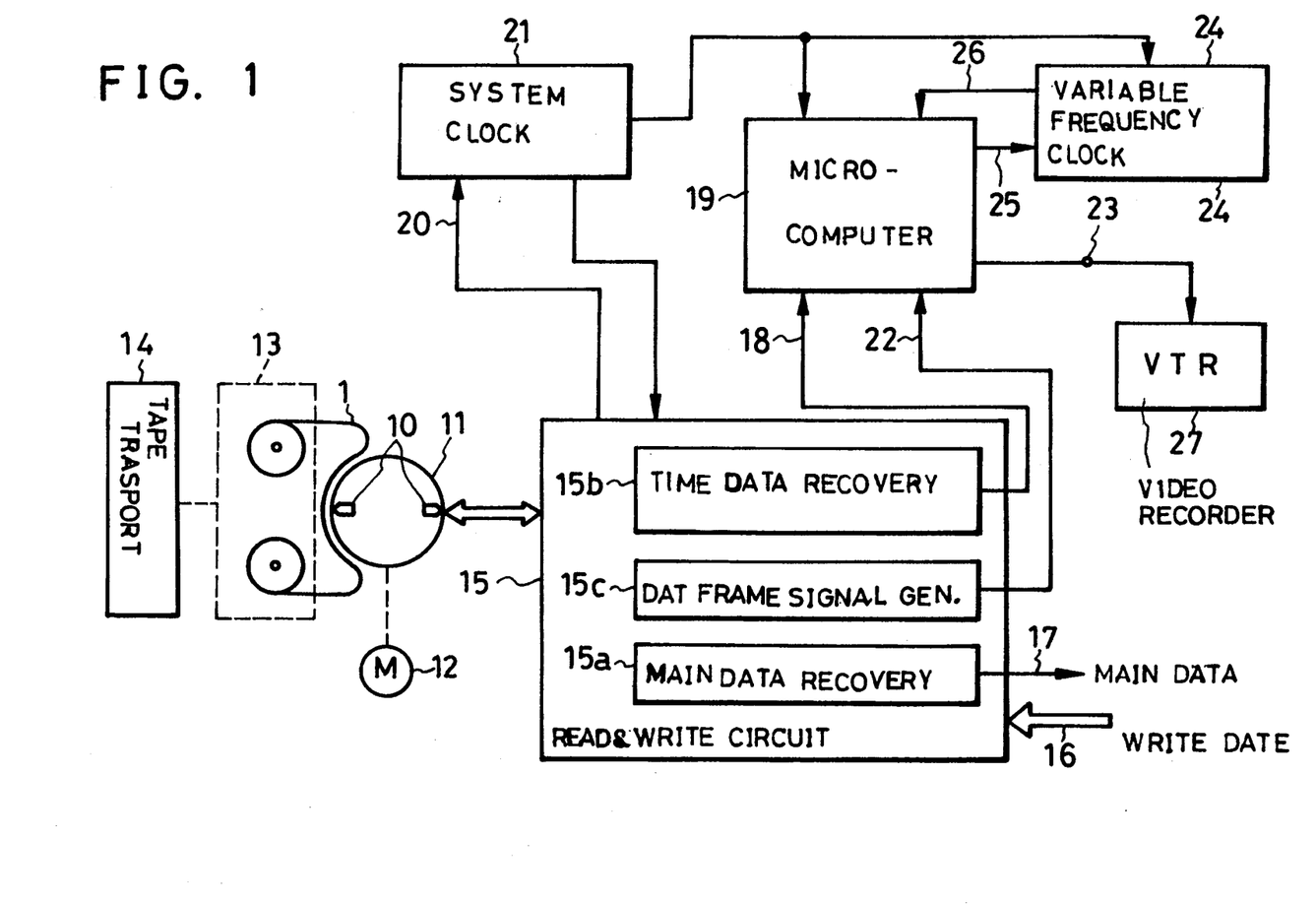
FIG. 1 is a block diagram of the DAT recorder embodying the principles of this invention.

In FIG. 1 the pair of heads 10 are coupled via a rotary transformer, not shown, to a read and write circuit 15. Coupled to the read and write circuit 15, an input bus 16 supplies main data to be recorded, which in this case is an audio signal, as well as time data which in this case is the IEC time code.

The read and write circuit 15 is shown to comprise only a main data recovery circuit 15a, a time data recovery circuit 15b and a DAT frame signal generator circuit 15c. As the names imply, the main data recovery circuit 15a derives the audio signal from the outputs from the heads 10; the time data recovery circuit 15b derives the IEC time code and phase difference data from the head outputs; and the DAT frame signal generator circuit 15c generates a DAT frame signal, that is, a series of pulses indicative of the beginnings of the frames of the DAT track format. The audio signal is sent to the next processing stage over a line 17. The IEC time code and phase difference data are sent to a microcomputer 19 over a line 18. The DAT frame signal is also sent to the microcomputer 19 over a line 22. It is understood that the read and write circuit 15 further includes a circuit for extracting system clock data from the subcode zones 3 of the tape tracks, for delivery over a line 20 to a system clock 21.

Various other circuits conventionally included in the read and write circuit 15 are not shown because of their impertinence to the invention. An analog to digital converter connected to the input bus 16, and a digital to analog converter connected to the main data recovery circuit 15a are also not shown because of their well known nature.

Comprising a central processor unit, the microcomputer 19 reconstructs the IEC time code and serially produces the bits of the reconstructed data through an output terminal 23 to which a video tape recorder 27 is shown connected. It is understood that the video recorder 27 has the same IEC time code recorded as that on this DAT recorder. Audio and video information is to be synchronously played back by serially delivering the bits of the reconstructed IEC time code from DAT recorder to video recorder.

The invention employs a variable frequency clock 24 to enable the microcomputer 19 to serially output the bits of the IEC time code just as they have been recorded on the tape 1. The variable frequency clock 24 produces pulses needed by the microcomputer 19 in delivering the retrieved IEC time code to the video recorder 27 as a string of bits. The clock pulses have a standard repetition frequency of, typically, 5.33333 kilohertz, but this frequency changes by a predetermined value, either in an increasing or decreasing direction, in response to a control signal fed from the microcomputer 19 over a line 25. Such variable frequency clock pulses are supplied to the microcomputer 19 over a line 26 for controlling a buffer memory, not shown in FIG. 1, included therein. The system clock 21 has an output coupled to both microcomputer 19 and variable frequency clock 24.

Figure 4:
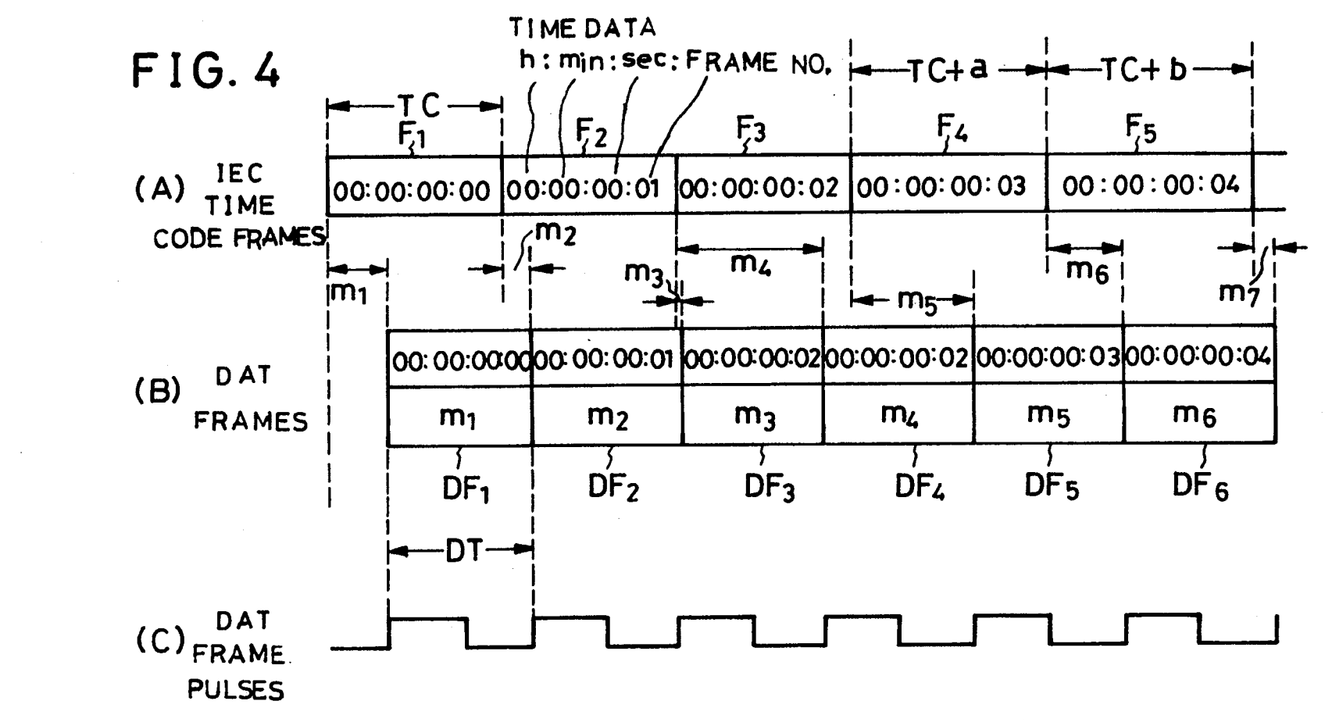
FIG. 4, consisting of (A) through (C), is a timing chart explanatory of the time relationship among the supplied IEC time code frames, DAT frames, and DAT frame pulses representative of the beginnings of the DAT frames.
Figure 5:
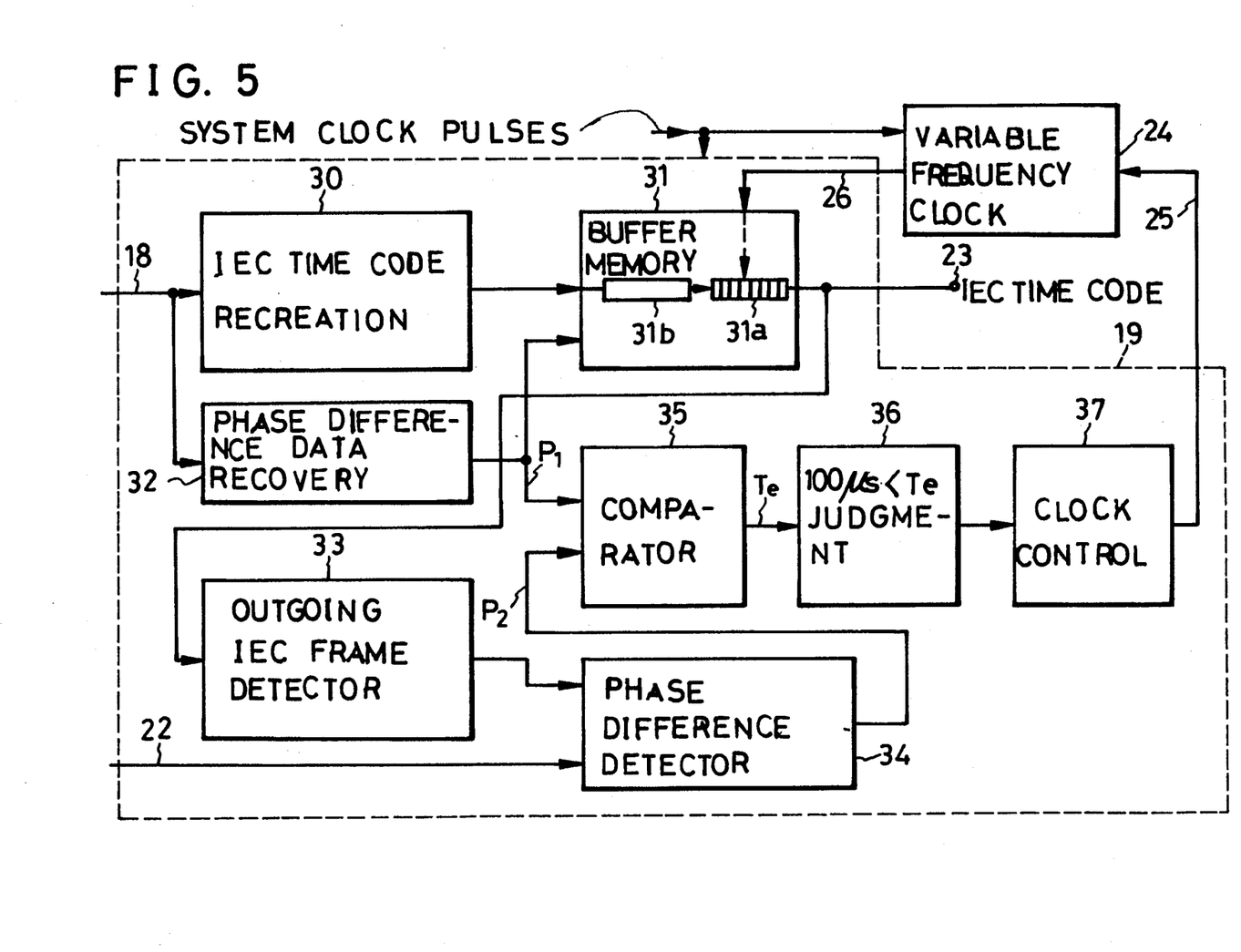
FIG. 5 is a block diagram explanatory of the functions of the microcomputer included in the FIG. 1 DAT recorder.

Functionally, the microcomputer 19 may be thought of as comprising the circuits shown in FIG. 5. The output line 18 of the time data recovery circuit 15b of the read and write circuit 15 of FIG. 1 is connected to an IEC time code recreation circuit 30, thence to a buffer memory 31, and thence to the output terminal 23. Inputting the time data supplied from the time data recovery circuit 15b over the line 18, the IEC time code recreation circuit 30 recreates the IEC time code, shown at (A) in FIG. 4 and at (C) in FIG. 6, in the form of the standard IEC frames.

The recreated IEC time code is stored in the buffer memory 31 preparatory to production from the output terminal 23 as a serial string of bits. The buffer memory 31 is provided with a shift register 31a for serial production of the IEC time code bits. The shift register 31a is driven by the clock pulses which are generated by the variable frequency clock 24 at a rate of two pulses per bit. Typically, the IEC time code is constituted of 80 bits per frame, so that 160 clock pulses are supplied per frame.

All the other circuits shown in FIG. 5 serve the common purpose of modifying the frequency of the clock pulses. Such additional circuits include, first of all, a phase difference data recovery circuit 32 having an input connected to the output line 18 of the time data recovery circuit 15b of the read and write circuit 15. This circuit 32 recovers the phase difference data P1 representative of phase differences m1, m2, . . . , shown in FIG. 4 between the frames of the supplied IEC time code and the DAT frames, from the phase difference data included in the time data supplied from the time data recovery circuit 15b of the read and write circuit 15.

Figure 6:
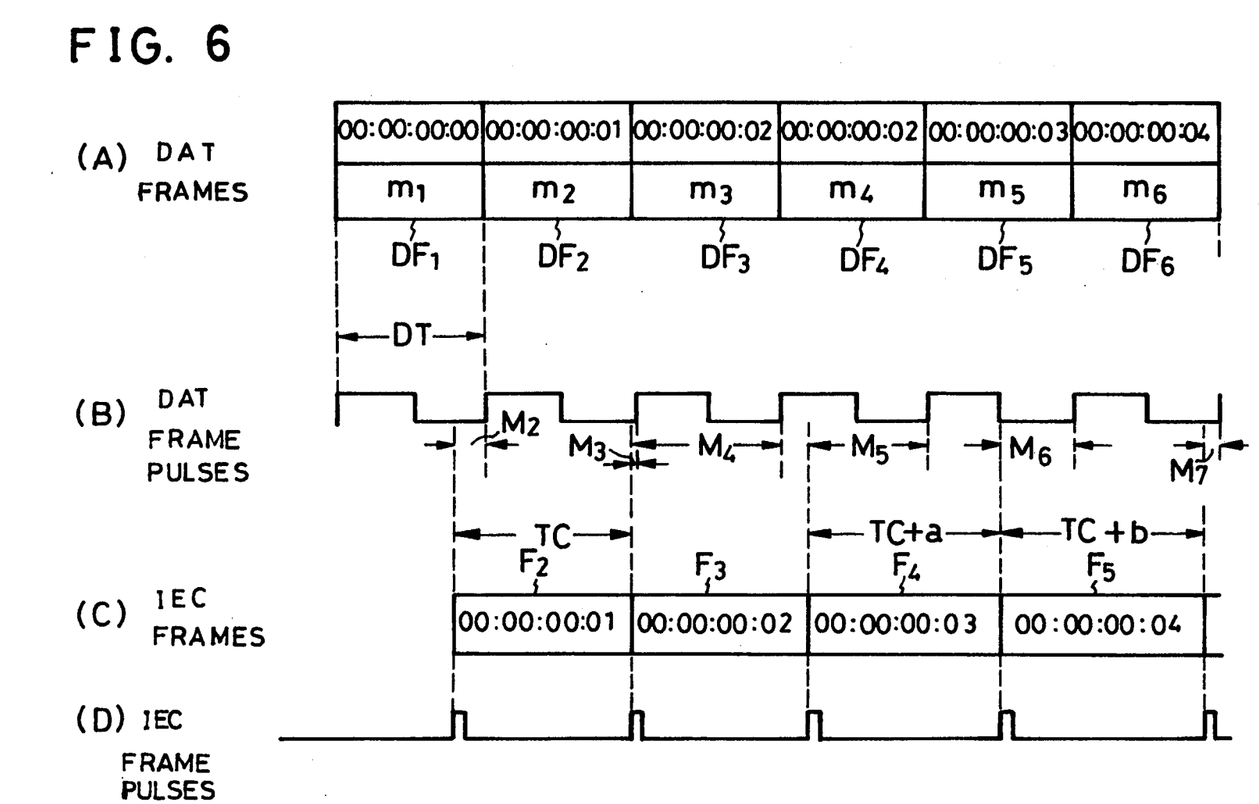
FIG. 6, consisting of (A) through (D), is a timing chart explanatory of the time relationship among the reproduced DAT frames and IEC frames, DAT frame pulses representative of the beginning of the DAT frames, and IEC frame pulses representative of the beginning of the IEC frames.

An outgoing IEC frame detector circuit 33 has an input connected to the output terminal 23 for creating a series of IEC frame pulses, shown at (D) in FIG. 6, indicative of the leading frame edges of the IEC time code, FIG. 6(C), being output through the output terminal 23. The IEC frame pulses are applied to a phase difference detector circuit 34, to which are also supplied the DAT frame pulses, FIG. 6(B), from the FIG. 1 read and write circuit 15. Thus the phase difference detector circuit 34 creates data P2 indicative of the phase differences M1, M2, . . . between the outgoing IEC frames F1, F2, . . . and the DAT frames. DF1, DF2, . . .

The phase difference data P1 and P2 from the circuits 32 and 34 are both delivered to a comparator circuit 35, which computes the difference Te between the inputs P1 and P2. Connected to the comparator circuit 35, a judgment circuit 36 determines whether the difference Te is greater or less than a predetermined length of time of, typically, 100 microseconds. A clock control circuit 37 is connected between the judgement circuit 36 and the variable frequency clock 24 for modifying the frequency of the clock pulses if the difference Te is greater than 100 microseconds. The clock pulse frequency is to be increased or decreased depending upon whether the difference Te is due to phase delay or phase advance.

Figure 7:
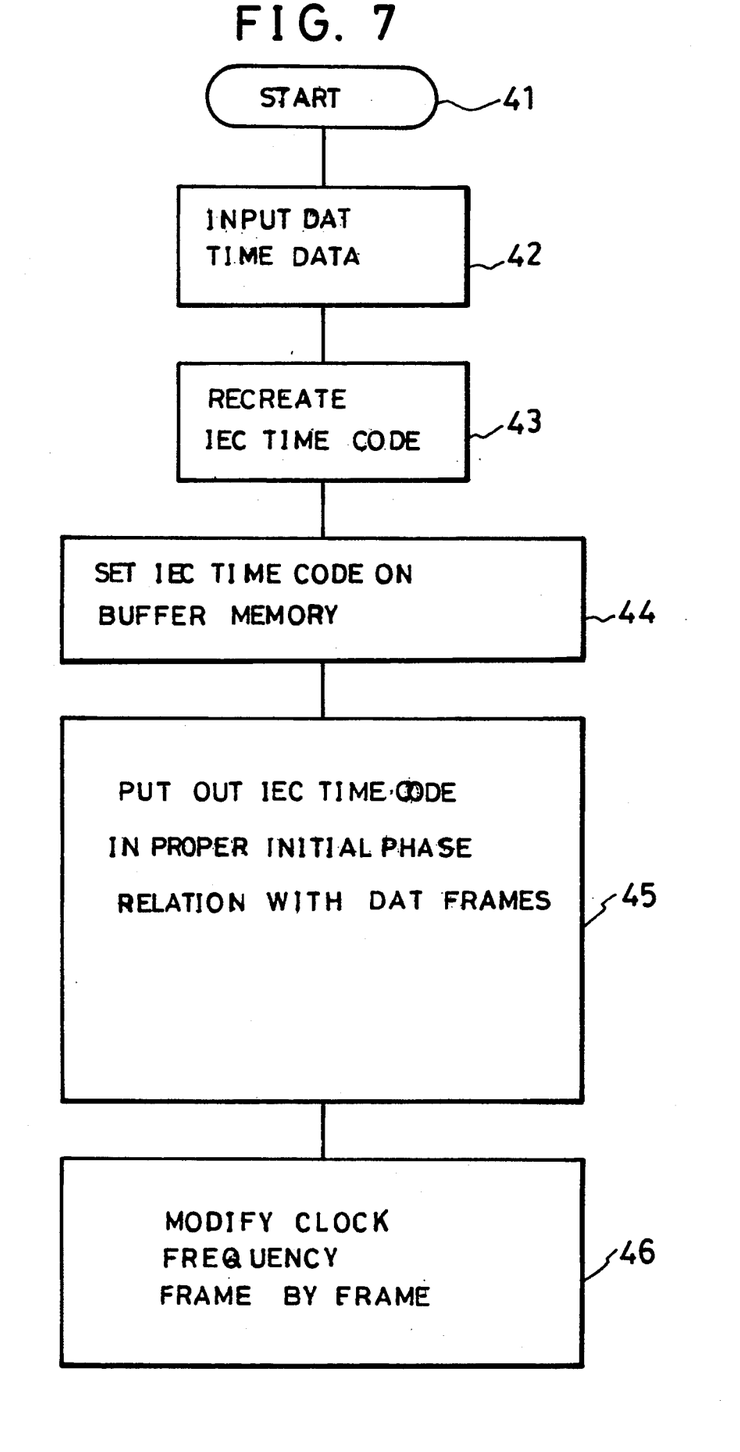
FIG. 7 is a flowchart explanatory of a sequence of operations for modifying the repetition frequency of clock pulses applied to the buffer memory of the FIG. 1 DAT recorder in producing the recreated IEC time code therefrom.

FIG. 7 shows a sequence of operations to be performed by the microcomputer 19 for maintaining the difference Te not more than 100 microseconds according to the invention. Starting at a block 41, the program dictates at the next block 42 to input the DAT time code and the phase difference data read on the tape 1. IEC time code in conformity with the IEC time code frames is then reconstructed from such input data, as set forth at the block 43.

Then, as indicated at the block 44, a first group of bits of the IEC time code are set in the shift register 31a of the buffer memory 31. Preferably, the shift register 31a may store eight bits at a time, and after all these bits have been output, the next group of eight bits may be simultaneously transferred to the shift register from a prepositioned memory 31b.

The first group of IEC time code bits are then to be serially delivered from the shift register 31a to the output terminal 23. To this end the clock pulses are supplied from the variable frequency clock 24 at a moment necessary to provide that phase relationship with the DAT frames which corresponds to the initial phase difference m1 (FIG. 4) between the frames of the recorded IEC time code and the DAT frames, as indicated at the block 45. After the shift register 31a has been emptied of the first group of IEC time code bits, the second group of bits are simultaneously supplied from the memory 31b and similarly output under the control of the clock pulses.

The same procedure is repeated until the all the bits of the first IEC time code frame are output. Thereafter, for supplying the subsequent frames of IEC time code to the video recorder 27, the pulses from the variable frequency clock 24 is modified in frequency frame by frame, as set forth in the block 46.

Figure 8:
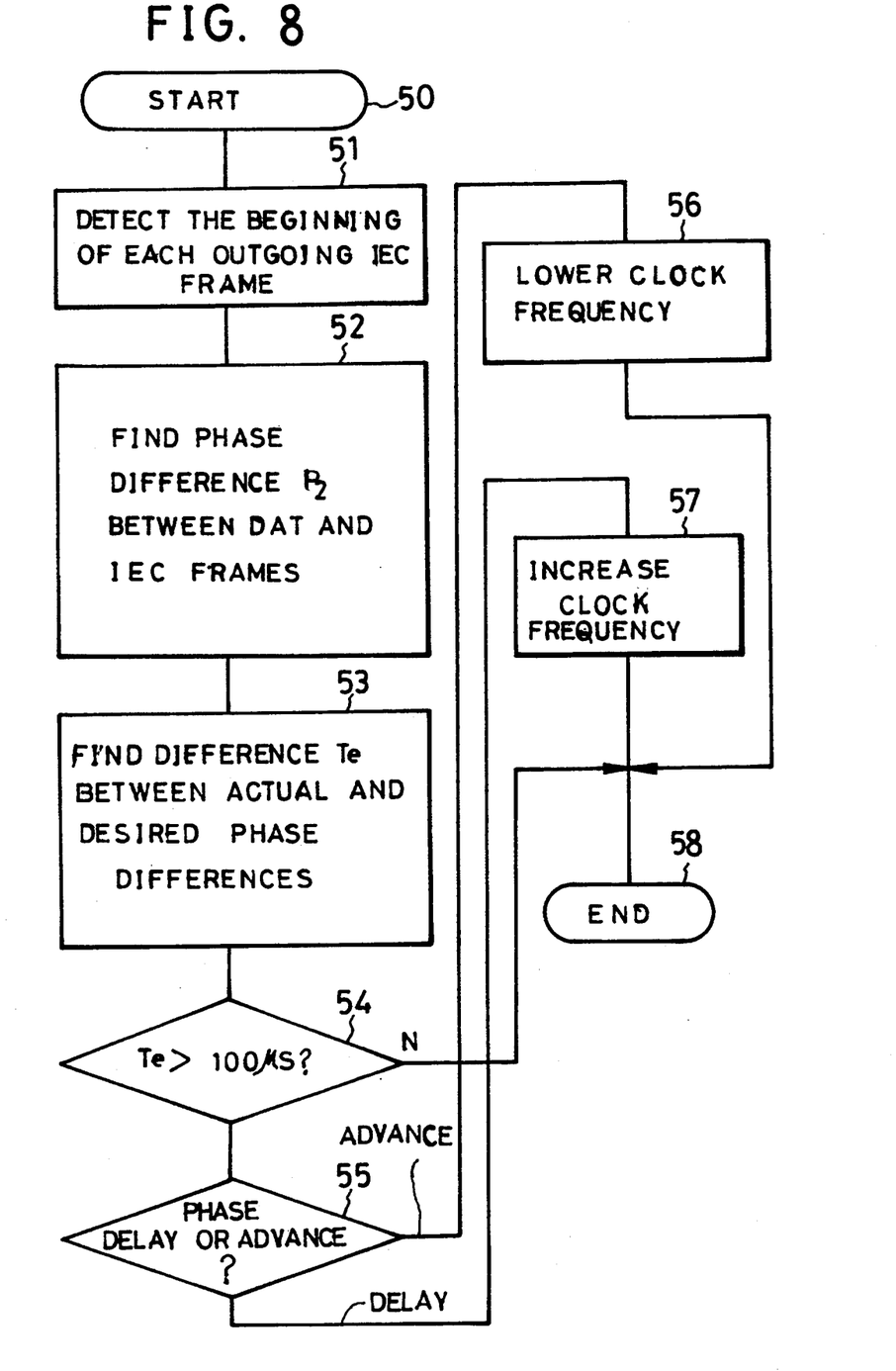
FIG. 8 is a flowchart showing in more detail how the clock pulse frequency is modified.

FIG. 8 is explanatory of how the clock pulse frequency of modified frame by frame according to the FIG. 7 block 45. Inputting the DAT frame signal from its generator circuit 15c (FIG. 1), over the line 22, the microcomputer 19 modifies the frequency of the clock pulses for each frame through the following procedure:

Starting at a block 50, the frame by frame modification routine proceeds to a block 51 according to which the leading frame edges of the IEC time code being output are detected. This objective is accomplished as the outgoing IEC frame detector circuit 33 generates the IEC frame pulses (FIG. 6(D)), in synchronism with the leading edges of the outgoing IEC time code frames, FIG. 6(C). Then the phase difference P2 between one outgoing IEC frame and one associated DAT frame recovered from the tape is detected by the phase difference detector circuit 34, FIG. 5, of the microcomputer 19 according to the block 52.

Then the difference Te is obtained by tile comparator circuit 35 between the desired phase difference $P_1$ read on the tape and the actual phase difference $P_2$, as set forth in the block 53. The comparator circuit 35 inputs the data representative of the desired phase difference $P_1$ from the phase difference data recovery circuit 32, and the data representative of the actual phase difference $P_2$ from the phase difference detector circuit 34.

Then comes a node 54 which asks whether the deviation Te of the actual phase difference $P_2$ from the desired phase difference $P_1$ is longer than 100 microseconds or not. No modification of the clock pulse frequency is necessary if the deviation is not more than 100 microseconds. If the deviation is longer than that length of time, on the other hand, it is questioned at the next node 55 whether the deviation Te is due to the phase advance or delay of the: outgoing IEC frames with respect to the DAT frames. The clock pulse frequency is lowered a predetermined value if the deviation Te is due to phase advance, at the block 56, and made higher the predetermined value if it is due to phase delay, at the block 57. Then the clock pulse modification routine comes to an end at 58 for one frame, and the same routine is repeated for each of the subsequent frames.

Possibly, the difference Te between recorded phase difference $P_1$ and actual phase difference $P_2$ may be so much more than 100 microseconds that the difference cannot be eliminated in one frame. Then the clock pulse frequency will be increased or decreased the same predetermined value in each of any required number of subsequent frames until the difference Te lessens to 100 microseconds or less. Such gradual elimination of the difference is preferable from the standpoint of simplicity in circuitry required.

Suppose, for a better understanding of the advantages gained by the invention, that the supplied IEC time code frames depicted at (A) in FIG. 4 have been supplied from some magnetic tape transport in which the tape speed grows less with time. Then the IEC time code frames will not have a constant length TC but will become progressively longer, as from TC to TC+ a and thence to TC+b. Being utilized for synchronization purposes, the IEC time code should desirably be delivered to the video recorder 27, or to any other equivalent device, as an exact replica of that recorded.

Therefore, according to the invention, the desired phase differences $P_1$ between the supplied IEC time code frames and DAT frames are obtained from the phase difference data recovered from the subcode zones of the tape tracks, and the actual phase differences $P_2$ between the outgoing IEC time code frames and the DAT frames are also obtained. Further the deviations Te of the actual phase differences $P_2$ from the desired phase differences $P_1$ are constantly monitored, and the deviations Te are kept within 100 microseconds by modifying the frequency of the clock pulses for each frame. It will thus be appreciated that the outgoing IEC time code frames of FIG. 6(C) very closely approximate the supplied ones of FIG. 4(A).

The video recorder 27 has recorded on its video tape the same IEC time code frames as those recorded on the tape 1 of this DAT recorder. Exact synchronization of audio and video information will be accomplished if the video information is retrieved with the IEC time code frames from the DAT recorder synchronized with those on the video tape.

Despite the foregoing detailed disclosure, it is not desired that the invention be limited by the exact showings of the drawings or the description thereof. Changes may be made within the broad teachings hereof. For example, the recording of the phase difference data, representative of the frame by frame phase differences $m_1, m_2, m_3, \ldots$ between the supplied IEC time code frames and DAT frames, on the subcode zones of the tape tracks is not of absolute necessity. Such phase differences are obtainable by computations based upon the time difference mj, familiar to the DAT specialists, which is defined as:

$$TTj - jDT = mj$$

where $TTj$ = the length of time from the starting moment of the first IEC time code frame to that of the jth DAT frame, $jDT$ = the length of time from the starting moment of the first DAT frame to that of the fth DAT frame.

The time difference mj may be computed at the starting moment of each DAT frame, and the result may be recoded on the subcode zone along with the time data. The frame by frame phase differences $m_1, m_2, m_3, \ldots$ between the supplied IEC frames and DAT frames may then be computed from the recorded time difference values. The term "phase difference data" as used in the appended claims should be construed to include such time difference data.

The following is a list of additional modifications, alterations and adaptations of the illustrated embodiment which are all believed to fall within the scope of this invention:

1. The input of the outgoing IEC frame detector circuit 33, FIG. 5, could be connected to the IEC time code recreation circuit 30, instead of to the output terminal 23, if the outgoing IEC time code frame timing were ascertainable from the reconstructed IEC time code; in other words, the outgoing IEC frame edges could be computed rather than detected.

2. The frequency of the clock pulses applied to the buffer memory 31 could be controlled according to the length of time of each outgoing IEC time code frame obtained by computation from the IEC time code reconstructed by the circuit 30. In this case, too, the clock pulse frequency might be altered when the duration of each outgoing time code frame exceeded a predetermined limit.

3. Synchronization data other than the IEC time code could be adopted.

4. The invention may be appalled to synchronous operation of optical disk drives and video recorders and of various other combinations of such known devices.

5. The invention may also hie applied to the reproduction of information in general wherever it is desired to modify the frequency of clock pulses applied to a buffer memory on the output stage according to possible variations in the relative scanning speed between data storage medium and data transducer.

What is claimed is:

1. In an apparatus having transducer means for reading digital data on a storage medium, the storage medium having such data recorded thereon in the form of a first standard series of frames, the recorded data including time data which has been supplied in the form of a second standard series of frames different from the first standard series of frames, and phase difference data indicative of phase differences between the first and the second standard series of frames, a method of serially outputting bits of the time data with the second standard series of frames in the same phase relationship to the first standard series of frames as on the storage medium, said method comprising the steps of:
  (a) reading the digital data from the storage medium;
  (b) recreating the time data read by the transducer means from the storage medium;
  (c) successively storing the bits of the recreated time data in a buffer memory;
  (d) applying clock pulses to said buffer memory for serially outputting the stored bits at a rate determined by the repetition frequency of said clock pulses;
  (e) detecting a first series of phase differences between the first and the second standard series of frames from the phase difference data on the storage medium;
  (f) detecting a second series of phase differences between the first standard series of frames and the second standard series of frames of the recreated time data;
  (g) comparing the first and the second series of phase differences; and
  (h) changing the repetition frequency of the clock pulses being applied to the buffer memory according to the differences between the first and the second series of phase differences.

2. The method of claim 1 wherein the repetition frequency of the clock pulses is controlled by:
  (a) judging whether each difference between the first and the second series of phase differences is greater than a predetermined limit; and
  (b) increasing or decreasing the repetition frequency of the clock pulses a predetermined degree if each difference between the first and the second series of phase differences is greater than the predetermined limit.

3. In an apparatus having transducer means for reading digital data on a storage medium, the storage medium having such data recorded thereon in the form of a first standard series of frames, the recorded data including time data which has been supplied in the form of a second standard series of frames different from the first standard series of frames, and phase difference data indicative of phase differences between the first and the second standard series of frames, a method of serially outputting bits of the time data with the second standard series of frames in the same phase relationship to the first standard series of frames as on the storage medium for synchronization of the apparatus with another apparatus, said method comprising the steps of:

(a) reading the digital data from the storage medium;
(b) recreating the time data read by the transducer means from the storage medium;
(c) successively storing the bits of the recreated time data in a buffer memory;
(d) applying clock pulses to said buffer memory for serially outputting the stored bits at a rate determined by the repetition frequency of said clock pulses;
(e) detecting a first series of phase differences between the first and the second standard series of frames from the phase difference data on the storage medium;
(f) generating a first frame signal indicative of the first standard series of frames on the storage medium, and a second frame signal indicative of the second standard series of frames of the recreated time data;
(g) detecting, from the first and the second frame signals, a second series of phase differences between the first standard series of frames on the storage medium and the second standard series of frames of the recreated time data;
(h) detecting the deviations of the second series of phase differences from the first series of phase differences; and
(i) changing the repetition frequency of the clock pulses being applied to the buffer memory according to the deviations of the second series of phase differences from the first series of phase differences.

4. The method of claim 3 wherein the second frame signal represents the second standard series of frames of the recreated time data being output by the buffer memory.

5. The method of claim 3 wherein the repetition frequency of the clock pulses is controlled by:

(a) judging whether the deviation of each of the second series of phase differences from one of the first series of phase differences is greater than a predetermined limit; and
(b) increasing or decreasing the repetition frequency of the clock pulses a predetermined degree if the deviation of each of the second series of phase differences from one of the first series of phase differences is greater than the predetermined limit.

6. The method of claim 5 wherein the predetermined limit is about 100 microseconds.

7. In an apparatus having transducer means for reading digital data on a storage medium, the storage medium having such data recorded thereon in the form of a first standard series of frames, the recorded data including time data which has been supplied in the form of a second standard series of frames different from the first standard series of frames, and phase difference data indicative of phase differences between the first and the second standard series of frames, a system for serially outputting bits of the time data with the second standard series of frames in the same phase relationship to the first standard series of frames as on the storage medium, the system comprising:

(a) a read circuit for recreating the digital data read by the transducer means from the storage medium;
(b) recreation circuit means connected to the read circuit for recreating the time data in the form of the second standard series of frames;
(c) a buffer memory connected to the recreation circuit means for successively storing the bits of the recreated time data and for serially outputting the recreated time data as a string of bits in response to clock pulses;
(d) a variable frequency clock for supplying said clock pulses to said buffer memory, said clock pulses having variable repetition frequencies to enable the buffer memory to output the bits of the recreated tine data at a rate determined by the repetition frequency of the clock pulses;
(e) first phase difference detector means for detecting a first series of phase differences between the first and the second standard series of frames from the phase difference data on the storage medium;
(f) second phase difference detector means for detecting a second series of phase differences between the first standard series of frames on the storage medium and the second standard series of frames of the recreated time data;
(g) comparison means for comparing the first and the second series of phase differences; and
(h) clock control means connected between the comparison means and the variable frequency clock for controllably varying the repetition frequency of the clock pulses according to differences between the first and the second series of phase differences.

8. The system of claim 7 wherein the clock control means comprises:

(a) a judgement circuit for judging whether each difference between the first and the second series of phase differences is greater than a predetermined limit; and
(b) a clock control circuit for increasing or decreasing the repetition frequency of the clock pulses a predetermined degree if each difference between the first and the second series of phase differences is greater than the predetermined limit.

9. In an apparatus having transducer means for reading digital data on a storage medium, the storage medium having such data recorded thereon in the form of a first standard series of frames, the recorded data including time data which has been supplied in the form of a second standard series of frames different from the first standard series of frames, and phase difference data indicative of phase differences between the first and the second standard series of frames, a system for serially outputting bits of the time data with the second standard series of frames in the same phase relationship to the first standard series of frames as on the storage medium for synchronization of the apparatus with another apparatus, the system comprising:

(a) a read circuit for recreating the digital data read by the transducer means from the storage medium, the read circuit comprising a first frame signal generator circuit for generating a first frame signal indicative of the first standard series of frames on the storage medium;
(b) recreation circuit means connected to the read circuit for recreating the time data in the form of the second standard series of frames;
(c) a buffer memory connected to the recreation circuit means for successively storing the bits of the recreated time data and for serially outputting the recreated time data as a string of bits in response to clock pulses;

(d) a variable frequency clock for supplying said clock pulses to said buffer memory, said clock pulses having variable repetition frequencies to enable the buffer memory to output the bits of the recreated tine data at a rate determined by the repetition frequency of the clock pulses;

(e) first phase difference detector means connected to the read circuit for detecting a first series of phase differences between the first and the second standard series of frames from the phase difference data read from the storage medium;

(f) a second frame signal generator circuit for generating a second frame signal indicative of the second standard series of frames of the recreated time data;

(g) second phase difference detector means to the first and the second frame signal generator circuits for detecting a second series of phase differences between the first standard series of frames on the storage medium and the second standard series of frames of the recreated time data;

(h) comparison means for detecting deviations of the second series of phase differences from the first series of phase differences; and (i) clock control means connected between the comparison means and the variable frequency clock for controllably varying the repetition frequency of the clock pulses according to the deviations of the second series of phase differences from the first series of phase differences.

10. The system of claim 9 wherein the second frame signal generator circuit is connected to an output of the buffer memory so that the second frame signal represents the second standard series of frames of the recreated time data being output by the buffer memory.

11. The system of claim 9 wherein the clock control means comprises:

(a) a judgement circuit for judging whether the deviation of each of the second series of phase differences from one of the first series of phase differences is greater than a predetermined limit; and (b) a clock control circuit for increasing or decreasing the repetition frequency of the clock pulses a predetermined degree if the deviation of each of the second series of phase differences from one of the first series of phase differences is greater than the predetermined limit.

12. The system of claim 11 wherein the predetermined limit is about 100 microseconds.

* * * * *